May 16, 1933.    W. G. WILSON    1,909,479
VALVE STRUCTURE AND METHOD OF PRODUCING SAME
Filed June 6, 1929    2 Sheets-Sheet 1

May 16, 1933.    W. G. WILSON    1,909,479
VALVE STRUCTURE AND METHOD OF PRODUCING SAME
Filed June 6, 1929    2 Sheets-Sheet 2

Patented May 16, 1933

1,909,479

UNITED STATES PATENT OFFICE

WYLIE G. WILSON, OF ELIZABETH, NEW JERSEY, ASSIGNOR TO EVERLASTING VALVE COMPANY, OF JERSEY CITY, NEW JERSEY, A CORPORATION OF NEW JERSEY

VALVE STRUCTURE AND METHOD OF PRODUCING SAME

Application filed June 6, 1929. Serial No. 368,825.

My invention relates to mechanical structures comprising as principal parts, members adapted to be locked in assembled relation without the use of screw-threads, rivets, or the like. One form of the invention may comprise a member in the form of a ring adapted to be retained under pressure by a connecting member which applies compressive forces over a substantial area of the connecting parts, and the connecting member may comprise an anchoring device permanently deformed under pressure. A practical illustration of one embodiment of the present invention is a valve member carrying an annular facing or packing element held in position under compression by means of a permanently deformed retaining member in the form of a thimble or ring.

A particular feature of the invention resides in the use of a retaining ring provided with an internal bead, the retaining ring being pressed into place by expanding the bead.

The characteristics and advantages of the invention will be more fully explained in connection with the following detailed description by reference to the accompanying drawings which illustrate a preferred embodiment of the invention in the particular use specified.

It is to be understood that the specific embodiment disclosed herein is illustrative and not to be considered in the limiting sense in that it is contemplated that any type of structure or method of practicing the present inventions, as will occur to those skilled in the art, is within the scope of the present invention.

Referring now to the drawings throughout which like characters are used to represent like parts.

Figure 3:
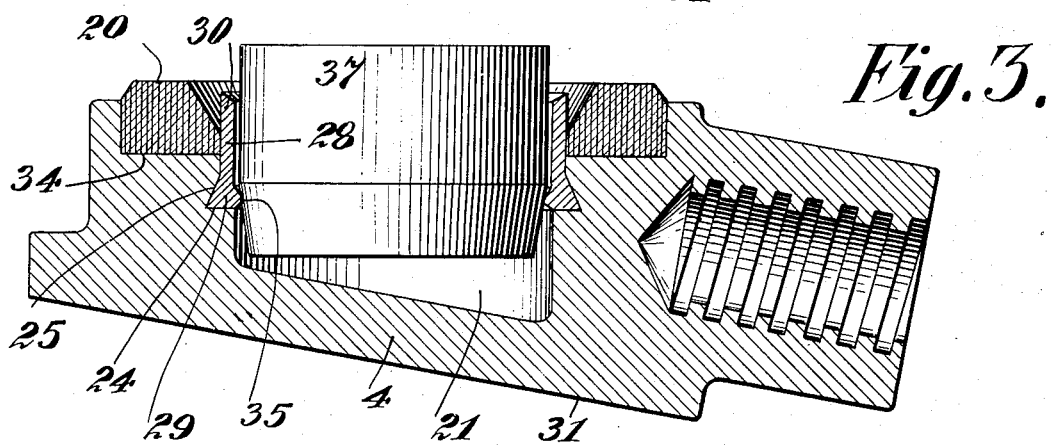

Fig. 3 indicates another step in the said method, and

Figure 4:
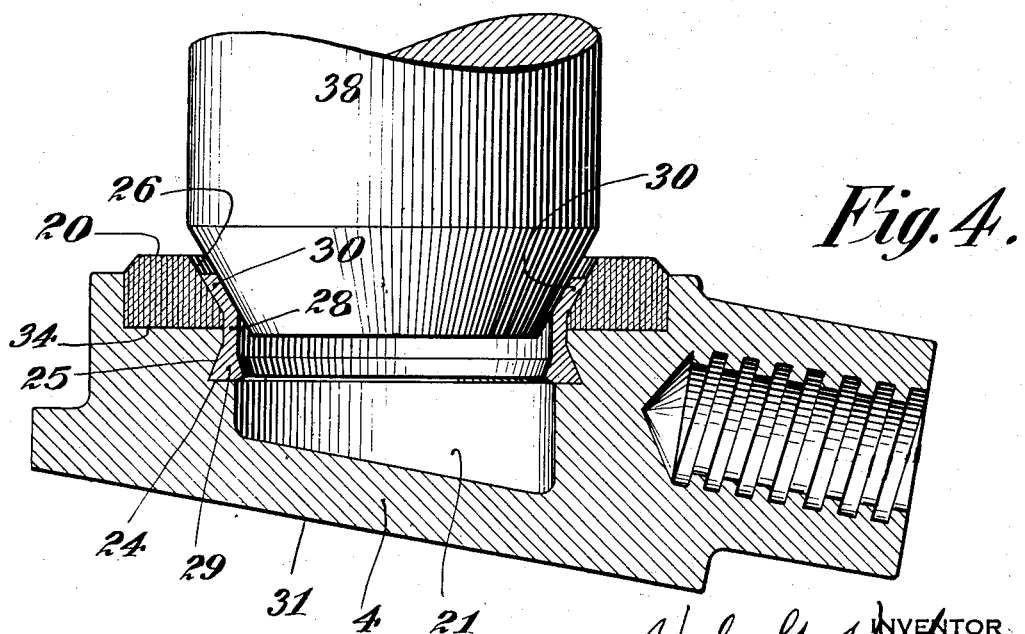

Fig. 4 illustrates the final step of said method.

Figure 1:
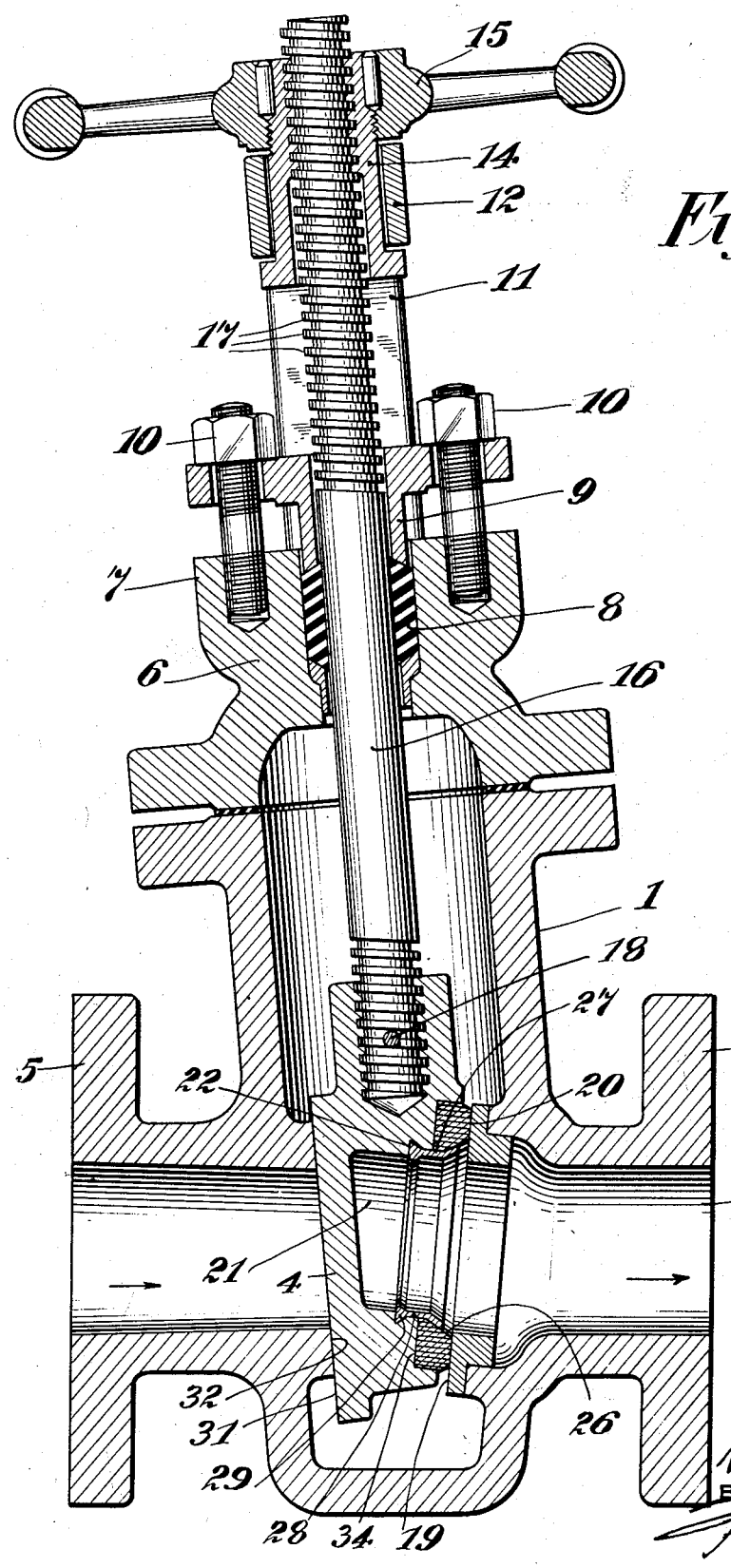
Fig. 1 is a sectional view through a valve illustrating one embodiment of the present invention..

Referring now to the drawings and more specially to Fig. 1, which illustrates a valve embodying one form of the present invention, the main valve casing 1 is provided with a conduit 2 adapted to be closed by a valve member 4. The main valve casing 1 is provided with connection flanges 5, as is common in the art, and with a neck portion 6 which carries a head 7 that is attached to the neck by suitable securing means such as screw bolts or the like (not shown). The head 7 preferably carries packing 8 which may be compressed by a packing gland 9 through the operation of the screw bolts 10. The arch 11 of the valve head comprises bearing 12 in which is rotatably mounted the operating nut 14, which is securely locked to the hand wheel 15. The valve operating shaft 16 is provided with screw threads 17 which engage the operating nut 14 to raise or lower the said shaft when the hand wheel 15 is operated to rotate the operating nut 14. The lower end of the valve shaft may be screw threaded into the valve 4 and locked thereto by cross pin 18.

The main valve casing 1 is provided with a valve seat 19 against which the valve 4 is adapted to seat. This valve seat may be of any suitable material having a relatively hard smooth operating face and is retained in position in the main valve casing in any suitable manner. The valve 4 carries a valve face 20 adapted to rest against the valve seat 19 and to form a joint which may be so tightly closed as to seal the conduit 2 against the passage of liquids or fluids therethrough. This valve face 20 preferably is formed of a slightly resilient material which in the preferred form may comprise laminated asbestos compressed and vulcanized. This material is slightly elastic and resilient and forms a slightly yielding member which may be tightly forced against the valve seat 19 to comprise a closure adapted to resist high pressure. This valve face member 20 in the preferred form comprises an annular ring which sits in a shouldered recess in the face of the valve member 4, and in the preferred form this valve member 4 is provided with a cupped recess 21 in which is cut an annular groove 22 with the plane of the bottom 24 of the groove being preferably substantially parallel to the face of the valve face 20; and the side wall 25 of the groove comprises a short frustum of a cone. Preferably a portion 26 of the surface of the opening 27 of the valve face member 20 is likewise inclined as a short frustum of a cone extending in the opposite direction from the inclination of the side wall of the groove 22 in the valve. A retaining member, which in the preferred form is a short tubular device 28, has its lower portion 29 expanded in the groove 22 in the valve member 4, thereby securely anchoring the retaining member 28 to the valve 4. The other end 30 of the retaining member 28 is likewise expanded against a conical surface 26 on the valve face member 20, thereby securely locking the valve face member 20 to the valve 4. In view of the fact that the expansion of the portion 29 of the retaining member 28 takes place under considerable pressure and that this member is permanently deformed, as is herein later explained, it will be observed that the valve face member 20 is retained in position at all times under compression.

The back of the valve member 4 is provided with a supporting face 31 which bears against an annular supporting surface 32 on the main valve casing 1. It will be observed that the plane of the supporting surface 32 on the valve casing 1 is angularly disposed to the plane of the valve seat 19 and that the supporting face 31 on the valve 4 is likewise angularly disposed to the seat of the valve face 20 so that as the valve shaft 16 is driven downwardly under the action of the operating nut 14 the valve 4 wedges itself into position to tightly compress the valve face member 20 against the valve seat 19. Under these conditions there is a slight tendency to compress the valve face member 20, which tendency is resisted by the retaining member 28, which has been set against the valve face member in a condition of permanent stress.

Figure 2:
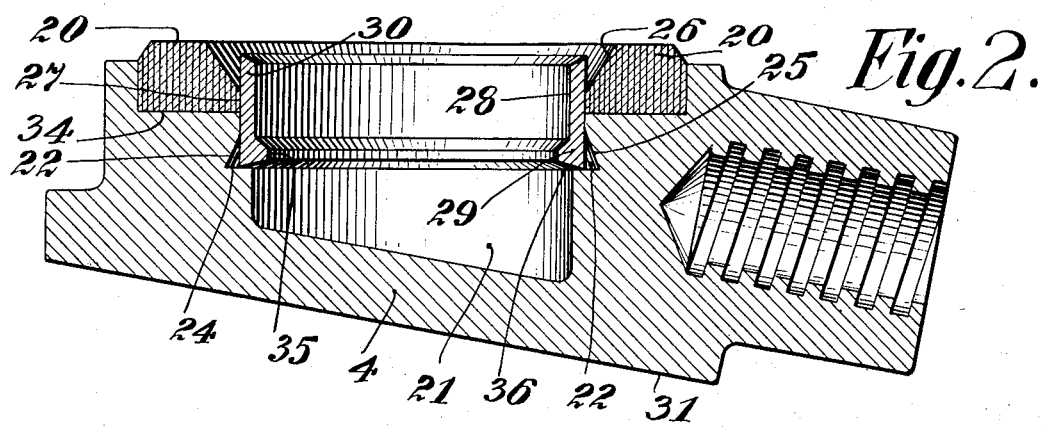
Fig. 2 illustrates a step in the method of assembling devices according to the present invention.

Referring now more particularly to Figs. 2, 3 and 4, which illustrate the method of assembly of the valve member, as previously explained, the valve face member 20 sits in an annular shoulder recess 34 in the valve member 4 and the groove 22 is cut in the side walls of the cupped recess 21. It will be observed that the diameter of the opening 27 in the valve face member 20 and that of the cupped recess 21 beneath the shoulder 24 is slightly larger than the diameter of the cupped recess 21 beneath the shoulder 24. This construction permits the setting on this shoulder 24 of the short tubular retaining member 28. This retaining member 28 is provided on its lower edge with an internal bead 35, which bead is substantially opposite to the deepest portion of the groove 22. It will also be observed that the lower surface 36 of the retaining member 28 as illustrated in Fig. 2 bears substantially the same angle to the outside wall of the member 28 as does the plane shoulder 24 to the inclined surface 25 of the groove 22.

Referring now to Fig. 3, which illustrates the second step in the method of assembly, it will be observed that when an expanding mandrel 37 is forced against the internal bead 35 that the mandrel expands the lower edge of the retaining member 27, thereby forcing this lower edge outwardly so that the bottom of the retaining member 28 swings outwardly with the metal of valve 4 above the groove 22 as a fulcrum until the lower part 29 of the retaining member 28 has been tightly expanded against the side walls of the groove 22 and the lower surface 36 on the retaining member 28 is in close engagement with the plane 24 comprising the bottom of the groove 22. This expanding action is of such an extent as to permanently distort and set the metal of the retaining member 28 in position so that the retaining member will not spring back from the expanded position and it will thereby be noted that the retaining member is now securely anchored to the valve 4.

Referring now more specially to Fig. 4 which illustrates the final step in the method, and which shows a larger expanding mandrel 38 having the point 39 thereof comprising a downwardly extending frustum of a cone, the side walls of which are parallel to the surface 26 on the valve face member 20. This expanding mandrel 38 is forced downwardly into the open end of the retaining member 28. This action tightly compresses the mid portion of the retaining member 28 against the side wall of the valve 4 and the inner edge of the valve face member 20 so that this portion of these members acts as a fulcrum about which the upper end 30 of the retaining member 28 expands outwardly. As the mandrel 38 is pressed home the upper end 30 of the retaining member 28 is permanently distorted and tightly set against the inner face of the valve face member 20. This action tends to compress the valve face member against its own seat in the valve member 4 and places this valve face member under compression which is not relieved when the expanding mandrel 38 is released from pressing against the retaining member 28. By the above method it will be observed that the valve face member 20 is most securely and rigidly locked in the position on the valve 4 without the use of screws or other anchoring means which may tend to loosen in use and that furthermore this valve seat member is so securely locked in place as to resist any forces operative during the use of the valve which might tend to loosen the valve face member on the valve 4.

In carrying out the above methods, the order of operation may be reversed in that the upper end 30 of the retaining member 28 may first be expanded against the valve face member 20 and then the other end 29 of the retaining member 28 may be expanded into the groove 22. It will be observed that the action on the metal in the retaining member 28, in carrying out this method, is more than a mere expansion of the metal. This is particularly true with reference to the action adjacent the internal bead 35. It will be observed that after the retaining member 28 has been securely seated in the groove 22, the further pressure exerted by the expanding mandrel 37, flows the metal of the bead 35 around the mandrel 37 and places the metal in this lower portion 29 of the retaining member 28 under high compression rather than tension, and the pressure of the mandrel 37 on this part of the retaining member tends to harden and set the metal in the retaining member very firmly in position to anchor the parts together. Therefor, the anchoring portion of the retaining member 28 is metal under a substantial compression, which resists any effort of the retaining member to withdraw from the groove 22. Furthermore, added metal at this portion due to the bead 35 resists any force tending to distort the retaining member and unseat the same.

In the foregoing Figures 2, 3 and 4 it is to be understood that a suitable anvil is provided against which the expanding mandrels may operate and that suitable mechanical devices are provided to apply the necessary forces for producing the work required by the said mandrels.

It is also to be understood that the several parts, except where particularly designated therein, are to be made of metals and materials commonly used in the art for purposes such as those herein disclosed.

I claim:

1. A valve structure comprising a supporting member formed with a bore and with a counterbore forming a ring seat having an outer supporting shoulder, the supporting member being formed below the ring seat with a groove, a sealing ring formed of resilient material lying on the ring seat and in engagement with the outer supporting shoulder, and an inner metallic gripping ring having its upper end deformed outwardly against the sealing ring to retain the sealing ring in a highly compressed condition, the lower end of the gripping ring being formed with a bead which is permanently deformed into gripping engagement with said groove.

2. A valve structure comprising a supporting member formed with a bore and with a counterbore forming a ring seat having an outer supporting shoulder, the supporting member being formed below the ring seat with a groove, a sealing ring formed of resilient material lying on the ring seat and supported by the outer supporting shoulder, and an inner metallic gripping ring having its upper end deformed outwardly against the sealing ring to retain the sealing ring in a highly compressed condition, the lower end of the gripping ring being formed with a bead which is permanently deformed into gripping engagement with said groove.

3. A valve structure comprising a supporting member formed with a ring seat, a circular supporting shoulder surrounding the ring seat, the supporting member being formed below the ring seat with a recess, a sealing ring formed of resilient material lying on the ring seat and supported by the circular supporting shoulder, and an inner metallic gripping ring having its upper end deformed outwardly against the sealing ring to retain the sealing ring in a highly compressed condition, the lower end of the gripping ring being formed with a bead which is permanently deformed into gripping engagement with said recess.

In testimony whereof I affix my signature.

WYLIE G. WILSON.